(12) United States Patent
Wagner

(10) Patent No.: US 7,167,642 B1
(45) Date of Patent: Jan. 23, 2007

(54) HEATING APPARATUS WITH REMOVABLE CONTAINER, SUCH AS FOR FOODSTUFFS, AND FEATURES FOR MODERATING HEAT FLUX TO THE REMOVABLE CONTAINER

(76) Inventor: Alfred R. Wagner, 1432 W. Progress Dr., Hayden Lake, ID (US) 83835

( * ) Notice: Subject to any disclaimer, the term of this patent is extended or adjusted under 35 U.S.C. 154(b) by 0 days.

(21) Appl. No.: 11/345,841

(22) Filed: Feb. 1, 2006

(51) Int. Cl.
*A47J 27/00* (2006.01)

(52) U.S. Cl. .................. 392/441; 392/451; 99/331

(58) Field of Classification Search .................. None
See application file for complete search history.

(56) References Cited

U.S. PATENT DOCUMENTS

| | | | |
|---|---|---|---|
| 2,079,611 A | | 5/1937 | Harvey |
| 2,194,820 A | | 3/1940 | Connell et al. |
| 2,371,975 A | | 3/1945 | Parsons |
| 2,448,388 A | | 8/1948 | Plummer |
| 2,536,596 A | * | 1/1951 | Fisher .................. 219/436 |
| 2,682,602 A | | 6/1954 | Huck |
| 3,757,671 A | * | 9/1973 | Warshauer et al. ............ 99/400 |
| 3,806,701 A | | 4/1974 | Scott |
| 3,892,945 A | * | 7/1975 | Lerner .................. 219/437 |
| 3,908,111 A | | 9/1975 | DuBois et al. |
| 4,307,287 A | | 12/1981 | Weiss |
| 4,438,324 A | | 3/1984 | Narita et al. |
| 4,523,083 A | | 6/1985 | Hamilton |
| 4,672,179 A | * | 6/1987 | Onishi et al. ................ 219/441 |
| D293,871 S | | 1/1988 | Turner et al. |
| D308,154 S | | 5/1990 | Tow |
| D312,747 S | | 12/1990 | Keung |
| 5,072,095 A | | 12/1991 | Hoffmann |
| 5,073,699 A | | 12/1991 | Box |
| 5,203,257 A | * | 4/1993 | Goad .................. 99/483 |
| 5,274,215 A | | 12/1993 | Jackson |
| D350,454 S | | 9/1994 | Wong |

(Continued)

FOREIGN PATENT DOCUMENTS

DE        421697        1/1933

(Continued)

OTHER PUBLICATIONS

Walter Drake catalog or website, One-Quart Crockpot/Mini Slow Cooker, catalog p. 68; also website, Dec. 2005, USA.

*Primary Examiner*—Thor S. Campbell
(74) *Attorney, Agent, or Firm*—Gregory I.P. Law; Randy A. Gregory

(57) ABSTRACT

Apparatuses and methods for heating foodstuffs, or other contents sensitive to high heat flux, such as sauces and gravies, without sticking; so that watching and stirring of the foodstuff is not needed during heating. The novel apparatuses and methods provide such heating in a relatively quick time, such as one hour. A pitcher is shown which sets into a heating unit fitted with a heating element below a baffle that shields the bottom of the pitcher from radiant heat and has apertures which cause favorable convective heating which reduces the risk of sticking. The pitcher or pot is easily installed and removed from the heating unit and a close fit is formed in the installed position to retain heat between the pitcher and heating vessel. The methods include inducing a convective heat flow with the baffle and reduced direct radiant heat to reduce or prevent sticking.

20 Claims, 8 Drawing Sheets

U.S. PATENT DOCUMENTS

| | | |
|---|---|---|
| D370,588 S | 6/1996 | Brookshire et al. |
| D374,369 S | 10/1996 | Wilkinson |
| D398,474 S | 9/1998 | Wagner |
| 6,100,504 A | 8/2000 | Wagner |
| 6,516,709 B1 * | 2/2003 | Lin ............................. 99/331 |
| 6,809,302 B1 * | 10/2004 | Jones et al. ................. 219/521 |
| 6,872,921 B1 * | 3/2005 | DeCobert et al. ........... 219/441 |
| 2004/0123858 A1 * | 7/2004 | McFadden ................ 126/21 A |

FOREIGN PATENT DOCUMENTS

| | | |
|---|---|---|
| DE | 627227 | 3/1936 |
| GB | 609348 | 3/1946 |
| GB | 2061091 | 10/1979 |

* cited by examiner

HEATING APPARATUS WITH REMOVABLE CONTAINER, SUCH AS FOR FOODSTUFFS, AND FEATURES FOR MODERATING HEAT FLUX TO THE REMOVABLE CONTAINER

TECHNICAL FIELD

Apparatuses, such as appliances, and methods for heating foodstuffs, such as sauces, gravies, creamed meals, and other hard-to-heat contents without watching, stirring, sticking or scorching within a relatively short period of heating time with features for moderated heat flux.

BACKGROUND OF THE INVENTION

Heating and warming devices are well-known in the art of foodstuffs. Some foodstuffs are particularly difficult to heat without the cook watching and stirring to maintain the contents at even temperatures to avoid sticking, scorching, boiling over, and similar problems or inconveniences. This is particularly illustrated by sauces and gravy-type contents. It is also desirable to heat such contents without making a mess upon adjacent countertops and floors by avoiding bubbling and spattering.

Many prior devices suffer from the inability to eliminate overheating. Another problem suffered by most devices for heating contents susceptible to sticking are hot spots on the bottom of the pots or other containers or at other locations thereon. Overheating and uneven heating may cause foodstuffs being heated to stick, scorch or burn on the inside of the pot or container.

Until now, efforts to avoid the above-mentioned problems and control heat have involved what are commonly called "slow cookers". These slow cookers keep the temperature of the inside cooking vessel relatively low and even. In many cases heavy ceramic cooking vessels have been used to keep temperatures on the inside surface even and at the desired relatively low temperature levels. The heat flux is consistently low, distributing heat to the foodstuff heating container and to the contents in a manner which requires long periods of time, such as at least several hours and more commonly during the course of a working day.

The prior art also includes relatively complex heating devices, many having various controls for temperature, time or other operational parameters. These devices, in addition to the prior mentioned failings, often suffer from their complexity. Such features have caused users to misuse the devices or suffer difficulties. Such misuse and difficulties may be due to impatience causing overheating, prematurely turning the device off, and forgetting to turn the device on or off. Inconsistent results thus commonly occur due to the uneven heating caused by prior heating apparatuses for foodstuffs and the like which cannot be heated under high heat flux.

Thus, there has been a long-felt need for a cooking apparatus which can without watching, stirring and other monitoring, heat food in a manner which avoids or minimizes sticking, scorching, burning, and preferably without spattering of the contents. These needs have been further rendered difficult to achieve because, in the case of food, there are many times when heating within a relatively short period of time is highly desired. Accomplishing the above in heating times of about one hour or less has proven to be an extremely difficult problem to solve.

It is believed that to date all prior devices suffer significantly from one or more of these problems, or others. The current inventions seek to successfully address this long-felt need without suffering from or by minimizing such problems, constraints and difficulties.

BRIEF DESCRIPTION OF THE DRAWINGS

Preferred forms or embodiments of the inventions are explained and characterized herein, often with reference to the accompanying drawings. The drawings also serve as part of the disclosure of the inventions described herein. The drawings are briefly described below.

DETAILED DESCRIPTION OF THE PREFERRED EMBODIMENTS

Introductory Note

Figure 1:
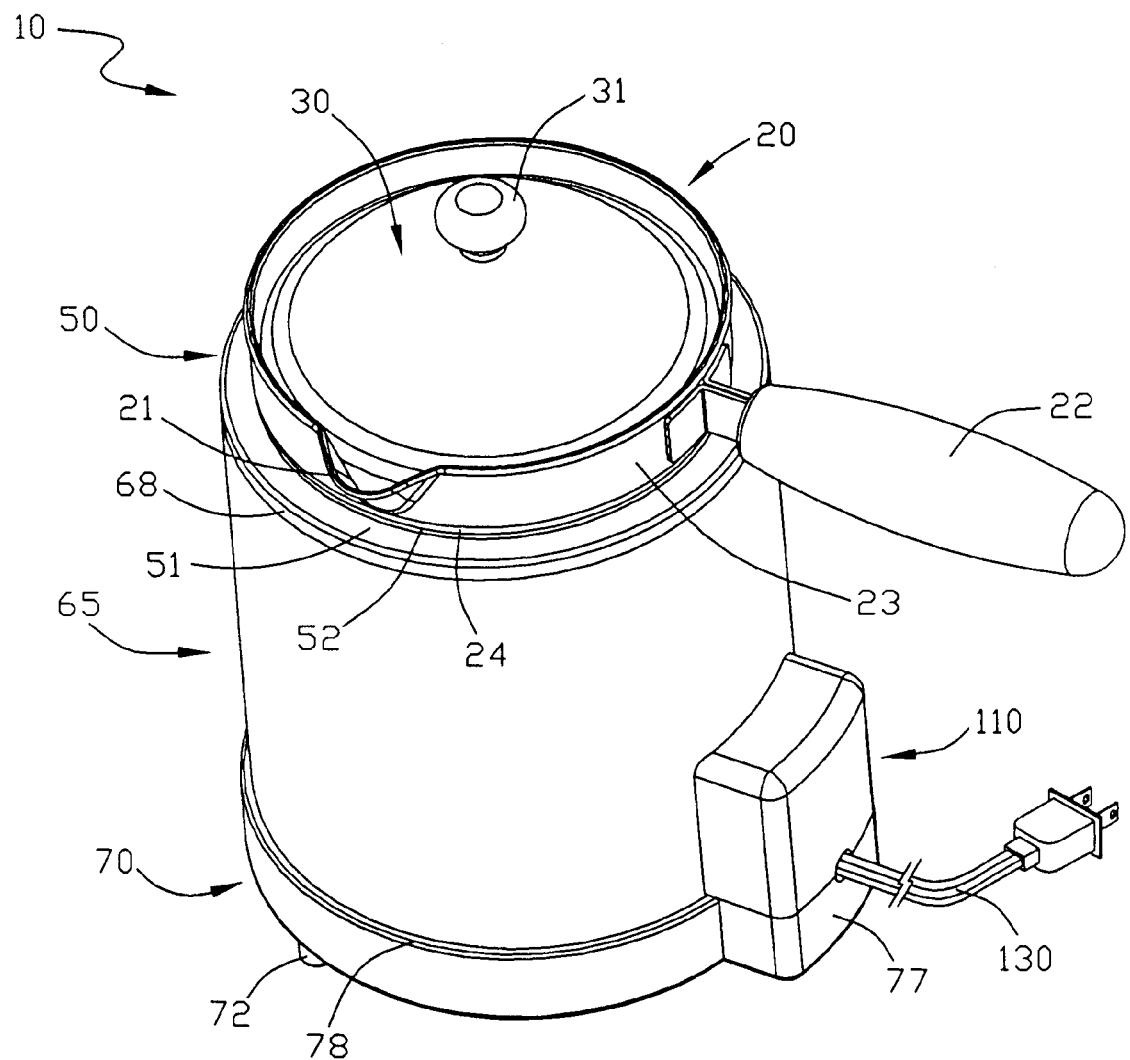
FIG. 1 is a perspective view of a preferred apparatus according to the inventions.

The readers of this document should understand that the embodiments described herein may rely on terminology used in any section of this document and other terms readily apparent from the drawings and the language common therefor as may be known in a particular art and such as provided by dictionaries. Widely known are *Webster's Third New International Dictionary*, *The Oxford English Dictionary (Second Edition)*, and *The New Century Dictionary*; all of which are hereby incorporated by reference for interpretation of terms used herein and for application and use of words defined in such references to more adequately or aptly describe various features, aspects and concepts shown or otherwise described herein using more appropriate words having meanings applicable to such features, aspects and concepts.

This document is premised upon using one or more terms with one embodiment that may also apply to other embodiments for similar structures, functions, features and aspects of the invention. Wording used in the claims is also descriptive of the invention and the text of the claims is incorporated by reference into the description entirely in the form of the claims as originally filed. Terminology used with one, some or all embodiments may be used for describing and defining the technology and exclusive rights associated therewith.

The readers of this document should further understand that the embodiments described herein may rely on terminology used in any section of this document and other terms readily apparent from the drawings and language common therefor. This document is premised upon using one or more terms with one embodiment that may also apply to other embodiments for similar structures, functions, features and aspects of the invention. Wording used in the claims is also descriptive of the invention and the text of the claims is incorporated by reference into the description entirely in the form of the claims as originally filed. Terminology used with one, some or all embodiments may be used for describing and defining the technology and exclusive rights associated herewith.

General Configuration of Combined Heating Assembly and Container Vessel

A preferred embodiment of the inventions and best mode according thereto is heating apparatus 10. Appliance 10 is shown in all the Figs. and can be conveniently viewed as a combination having a container vessel assembly 11 and a heating assembly 12. Container assembly 11 may be provided in various configurations, such as the pitcher assembly configuration 20 shown. Other types of pots, pitchers, and containers (not shown) and a variety of other shapes and sizes are possible and with reasonable testing may perform as well or superior to what is known at this time.

The container vessel or contents container 11 preferably is shaped in a manner which allows installation of at least part of the container(s) within the receptacle of the heating assembly at a container receiver described below. The container receiver holds the first container or vessel 11. The container 11 is advantageously complementary to the receptacle of the heating assembly to allow easy installation and removal of the container from the heating assembly which has a food container receiver therein. Additionally, the complementarity may affect performance.

As shown and described in greater detail below, the food container and heating assembly may be constructed to mate in a manner which either seals or is sufficiently close-fitting to reduce heat loss from between these two parts. The parts may be and typically will be complementary in shape and size to achieve this arrangement for their interaction and preferred construction while also providing for performance of the desired methods and operation further explained herein. Additional explanation is provided below concerning preferred constructions.

Figure 2:
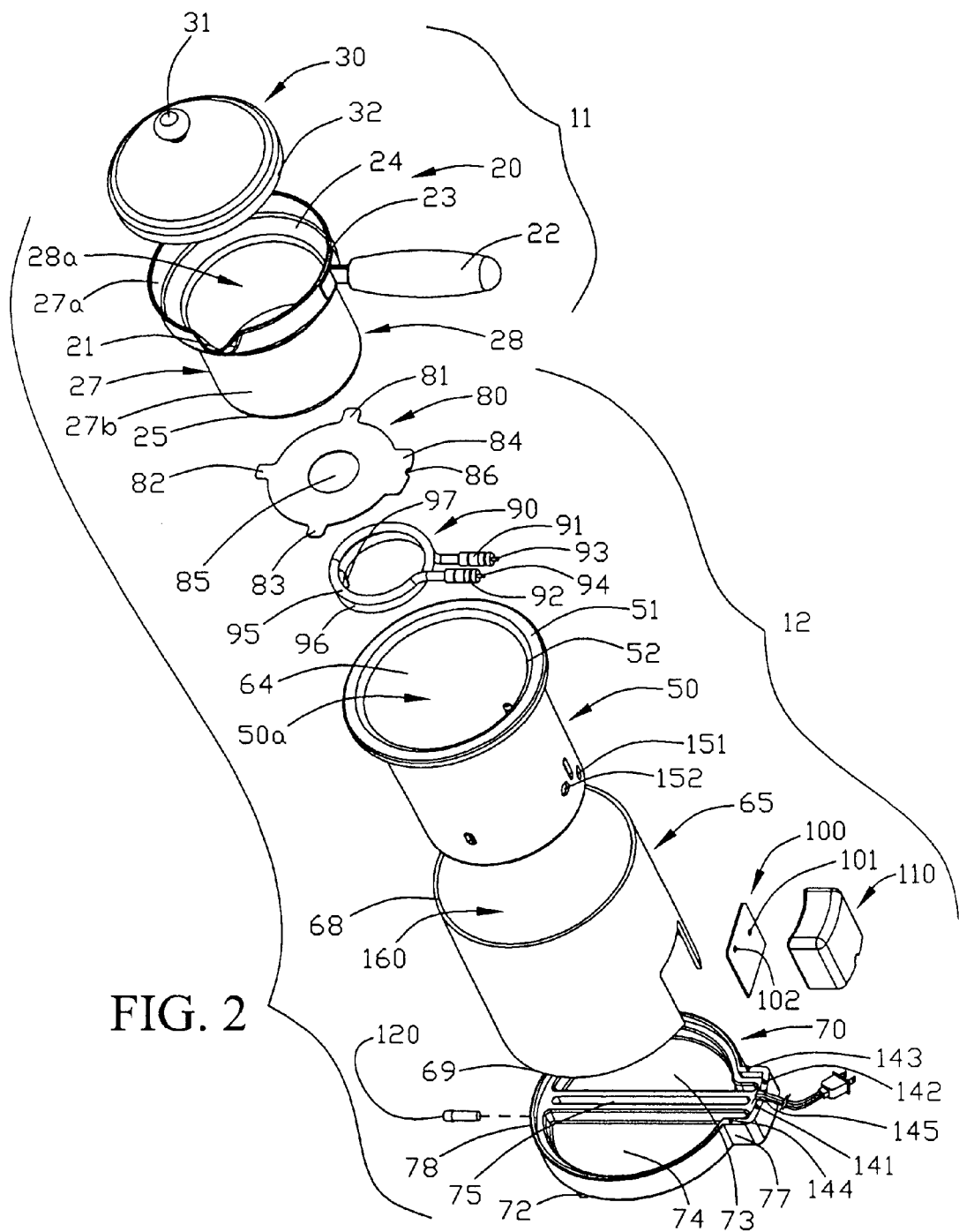
FIG. 2 is an exploded perspective view of the apparatus of FIG. 1.

FIG. 2 is an exploded perspective view of the preferred embodiment and shows the desired construction and ordering of the component parts of the preferred embodiment in an easily understandable manner.

In one specific preferred embodiment, and in more specific terms, the invention may advantageously be implemented in the form of an apparatus forming a device for heating foodstuffs. Such an apparatus or device advantageously comprises a pitcher for heating, having a cylindrical upper first portion and a cylindrical lower second portion, a pitcher lid for removably closing the pitcher, and/or a dividing shield acts as a buffer for reducing radiant heat flux and modifying air flow. Further shown are a conductive heat coil for heating air, a heating vessel with container receiver for removably accepting the lower or second portion of the pitcher, and for preferably housing the buffer shield, a conductive heat coil for heating the contents of the pitcher, a housing for enclosing the vessel, and a housing base, preferably having at least three feet, for attachment to a base end of the housing assembly, for enclosing the base end of the housing, and for supporting the vessel and the housing. As shown, the parts are suitably designed so the lower or second portion of the pitcher is positioned intermediate the side walls of the heating vessel 50. The exterior surface forming the side of the lower portion of the pitcher may be best if uniformly spaced in a relationship from the interior surface forming the inside wall of the heating vessel 50. The bottom of the pitcher is above and spaced from the top surface of the baffle shield 80.

Further, it is believed most beneficial if the heat source is positioned within the heating vessel 50. The buffer is currently believed best if spaced between the bottom of the pitcher and above the heating coil or other heat source. The heating coil is favorably built and mounted so as to be spaced from the bottom surface of the buffer and the interior bottom surface of the heating vessel.

Also as illustrated, the first or upper portion of the pitcher is above and unenclosed by the heating assembly. The second or lower portion of the pitcher is enclosed in the second or heating assembly. Also the buffer shield and the heating coil are currently believed best if arranged with the buffer between the food container and heat source. Also, the provision of an aperture or apertures through or around the buffer so as to provide inner opening(s) and outer openings(s) is desired. This is to allow a contiguous air space within the heating vessel 50 adjacent to the sides and bottom of the second or lower portion of the pitcher to induce convective air flow.

Some of the Preferred and Desired Objectives

The invention currently shown is believed to address one or more of the objectives described below. Other objectives not specifically listed in this section of this document may be implied by other parts of this description or only recognized later. No suggestion is intended that the preferred forms of the inventions described herein necessarily successfully accomplish all of the listed objectives or that forms of the invention developed hereafter may accomplish further objectives that are not specifically mentioned herein.

Among the desired objectives of the inventions are the minimization or elimination of physical contact of the food container with a heating source; the minimization of direct radiant energy from beaming onto the food container; and the inducement or enhancement of convection heating. These objectives contribute to the primary objective of automatic timely heating of sauces and side dishes, without stirring, sticking, scorching or burning within convenient time periods and also minimizing or preventing bubbling and spattering. Another goal is to heat sauces and have cleanup of the heating pitcher be simplicity itself. Another goal is to provide this in an apparatus which is fool-proof in operation to prevent accidental problems in the manner of heating, such as if a user may be interrupted or is forgetful yet and the apparatus still functions properly. Thus, there is a heat source of a predetermined heat output, no temperature adjustments, preferably no user switches, and no required stirring during heating. The current inventions seek to achieve one or more, or all, of these objectives and more.

Food or Contents Container

The illustrated foodstuff contents container is advantageously configured as a food pitcher assembly 20 which is constructed with a number of desirable features, but may be of simple or singular construction depending upon the needs and construction desired.

As shown, pitcher assembly 20 has a container vessel 28 (FIG. 2) which has a generally cylindrical configuration with a top opening 28a. The top opening is preferably wide so that food or other contents may be easily placed inside the pitcher or other container vessel and easily removed from the pitcher or other container vessel such as by using a ladle or other serving spoon or removal device (not illustrated).

The pitcher or other container vessel also has one or more side walls. As shown, the container has a cylindrical side wall or walls 27 which include an upper side wall portion 27a above shoulder 24, and a lower side wall portion 27b below shoulder 24. This may alternatively be thought of as divided by a line or area of contact between the two vessels. The shoulder section 24 also forms part of the side wall and is further adapted to act to facilitate sealing or close-fitting of the two mating parts.

Pitcher 20 is cylindrical, having an upper portion above shoulder 24. The upper portion of pitcher 20 has interior and exterior circumferences which are longer than the interior and exterior circumferences of the lower portion of pitcher 20. The lower portion of pitcher 20 is located below shoulder 24. The greater size of the upper portion is beneficial in providing an enlarged mouth for accepting and dispensing of food into and from the container, respectively.

Pitcher 20 may be made of various heat and moisture resistive, heat conductive materials such as copper, aluminum, carbon steel, cast iron, stainless steel, glass, ceramics, porcelain or other suitable materials. The most desirable materials are inherently non-toxic, whether coated or uncoated. Materials such as copper may require treatment as a practical matter to reduce intake of this metal when foodstuffs are heated. Other current and future materials may also be used if suitable to use in the construction and methods shown and described herein. For example, non-metal materials, such as ceramics or heat-resistive plastics may potentially be used if testing shows suitability for the particular construction shown. Currently, the container is advantageously made from a metallic material to improve heat flow through the container wall and to the contents by the heat conductive metallic container walls.

The preferred pitcher 20 is made from a desired material of sufficiently heavy gauge construction to facilitate even heat flux about and along the food container wall. Anodized aluminum having a gauge or thickness between approximately one sixtieth inch and one-quarter inch is desired, more preferably about one eighth inch.

Aluminum is currently preferred as the food or heating container because it conducts heat well, is light weight, relatively inexpensive, easily formed, and in the most desirable thicknesses heats the foodstuffs or other contents evenly. Such material may also be anodized upon either the exterior, interior or both. Exterior anodization has been found to provide better heat absorption compared to non-anodized aluminum. Anodization or other suitable surface treatment may also be used with other alternative materials for inside the food container. Such surface treatment or other suitable treatments may also be of advantage with other materials suitable for use in constructing the food container. The harder anodized or other oxidative form of aluminum has also been found durable and stick resistant.

It was found a relatively thick, hardened, anodized aluminum material worked best for the heating pitcher 20. An interior surface with a surface such as Calphalon® sold by the Calphalon Corporation can enhance the non-stick capability of the apparatus, but was not required for the apparatus to have non-stick properties. Other treatments may also be suitable or desirable. It may further be desirable to use one type of surface treatment or coating for the interior of the food container and a different type of treatment or coating for the exterior of the food container, although a singular treatment may be best in reducing costs of production. Still further, it may be desirable in some forms of the inventions to have one or both of the interior or exterior surfaces not treated or treated using other treatment or coating types and methods of application, or other treatments.

Pitcher 20 is advantageously provided with a bottom wall 25. Bottom wall 25 is advantageously flat in the preferred heating apparatus shown and described herein. A flat bottom wall makes pitcher 20 practical and suitable for placing on a flat surface without requiring a stand. The desired flat bottom 25 also decreases the surface area of bottom wall 25 of pitcher 20. A flat bottom wall with flat interior bottom surface 29 (FIG. 3) is also desired for removing foodstuffs from the pitcher 20 or other container. The flat bottom of the container or dish decreases the surface area of the sauce on the bottom, contributing to the evenness of heating. It also has the advantage of making the pitcher or other container capable of being removed from the device and placed on a surface without requiring a support stand. Further, it may provide better heating. Alternatively, the bottom wall of the containers may be wavy, grooved, of varying thickness or otherwise sized, shaped and configured to possibly provide better performance.

It is alternatively possible to construct pitcher 20 to have the same interior circumference in both its lower and upper portions. It is also possible to have the interior and exterior circumferences of the upper and lower portions of pitcher 20 be the same, without a wider upper portion. If a different support rim is added or used, it may be configured to extend from the exterior surface to function as a flange in alternative or addition to a support shoulder or flange 24. Such may particularly or wholly be used to support pitcher 20, such as in a suspended state, partially or holly within heating vessel 50.

The portion of pitcher 20 below shoulder 24 is approximately three-fourths of the total length of pitcher 20 as shown. Container 20 has a handle 22 connected to it by handle strap 23. Upper edge 21 of pitcher 20 has a ridge and a lip formed into it. This ridge and pouring lip 21 prevent handle connection strap 23 from sliding past rim 21. Lip or spout 21 also aids the pouring of sauces and liquids from pitcher 20.

FIGS. 1 and 2 show that the preferred embodiment of the heating assembly and the pitcher may include a lid 30. Lid 30 may be improved by providing a handle or lifting knob 31 in many variants according hereto. Beveled edge 32 may be provided on the lid for improved closure of the food container. Bevel 32 may also be advantageous for centering lid 30 on the brim of pitcher 20. Lid 30 or another cover may be made of any suitable material, such as non-toxic, heat and moisture-resistant materials. Such may include glass, metals, plastics, ceramics or porcelain. For cosmetic reasons, the currently preferred lid 30 is made from stainless steel with a suitable knob 31 made of various materials; for example, a heat-resistant plastic, wood, or other material.

Pitcher 20 or other container may also be beneficially provided with a container handle 22 attached to pitcher 20 or other container. The container handle 22 shown and preferred is connected using a connection strap 23 shown which extends about the upper side wall section 27*a*. Alternatively, other suitable fastening or attachment techniques may be used to connect a handle to the heated contents container 20.

As shown, pitcher 20 is provided with a desired support shoulder 24 for suspending pitcher 20 with at least portions of the container positioned within heating vessel 50. Shoulder 24 also provides a good surface for sealing or providing a tight-fitting relationship to the heating vessel.

The pitcher shown also is advantageously provided with a pouring lip or spout 21 to facilitate dispensing contents such as gravy, sauce or syrup by tilting the container so the contents flow from the container onto a plate, bowl or other accepting dish or container (not shown). One example is that spout 21 may be used to pour a tomato sauce onto spaghetti without the need to use a ladle or other utensil. Similarly, where the container is used to heat pancake syrup, the syrup may be conveniently poured in a desired direction using the spout.

Pitcher 20 is preferably received and positioned in the heating assembly to minimize or prevent contact with the heating vessel. As shown, it is suspended in opening 50*a* (FIG. 2) of the heating vessel 50 when positioned in the heating assembly. The full suspension features shown also preferably help to center the food container within the opening 50*a* to easily help balance the heat flux and space size between the inserted portion of pitcher 20 and the inside surface of the heating vessel. The complementary bevels on the food container and heating vessel may function to approximately self-center the container within heating vessel 50 by engaging the sloped or beveled shoulder 24 within a suitable complementary or mating beveled surface 52 of the heating assembly, or other supporting surface.

Alternatively or additionally, pitcher 20 may be suspended by supporting the pitcher upon a flat edge 51 of heating vessel 50. Other forms of support may also be possible.

The pitcher or other container may be heated and used with or without a lid. The time to heat without a lid may or may not make a difference in heating times. Some sauces may dehydrate without a lid; therefore, a lid is provided for these instances of use.

Heating Assembly Generally

Appliance 10 includes the heating assembly 12. The heating assembly or heater as shown includes a heating vessel 50, base 70, housing 65, heating element or other heat source 90, heating element control (not illustrated), any operational indicators (such as light emitting diode (LED) 120), baffle 80, and other features and aspects as are described below or elsewhere in this document.

The heating vessel 50 receives the pitcher described above using a pitcher or other container receiver. The receiver includes the structure on the heater, such as the brim having beveled surface 52 which may fully or partly support the container. It further includes the space within the heating vessel occupied by the container when installed therein.

Heating Vessel

Heating vessel 50 is shown housed in a heating assembly outer casing or shell 65 which can advantageously be of metal or plastic. Housing 65 can also be of any number of other suitable materials; however, one-eighth inch plastic is currently preferred. Heating vessel 50 is suspended or otherwise supported in the interior space 160 of outer casing 65. This may be accomplished by using the underside edge 51 of the peripheral top flange or using other suitable configurations. As shown, edge 51 rests upon an upper edge 68 of outer casing or housing 65.

Figure 3:
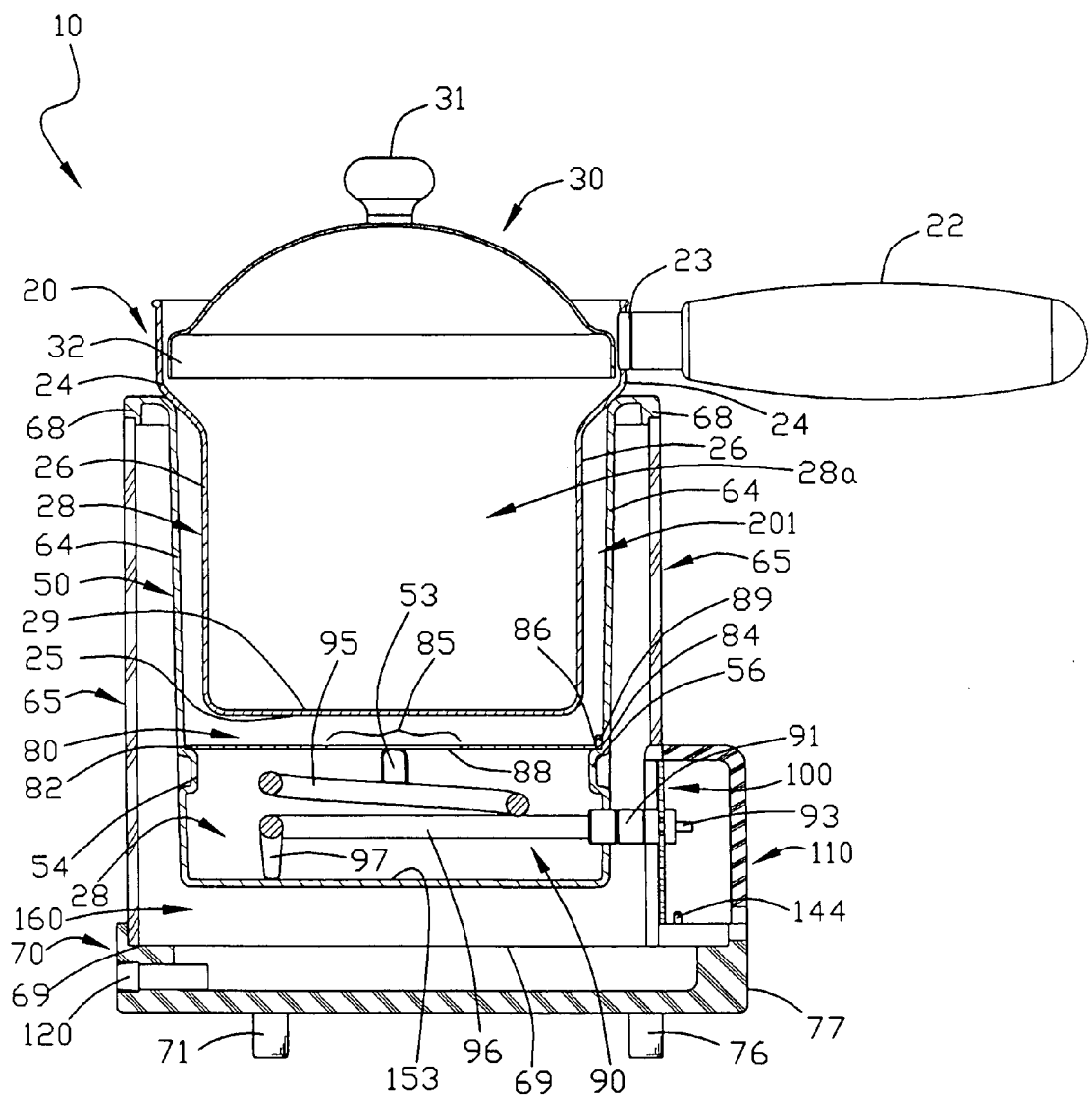
FIG. 3 is a cross-sectional view taken along line 3—3 of FIG. 6.

Heating vessel 50 is preferably centered and may be supported or suspended in outer casing 65 at upper edge 68 (FIG. 3). Outer casing 65 has a bottom edge 69 which rests on and connects with apparatus base 70 which is preferably made from a heavy plastic.

Base

The heating assembly 12 is advantageously provided with a base 70. Base 70 can be constructed in a number of suitable constructions. As shown, base 70 is part of and used to support heating assembly 12 on a countertop or other supporting surface.

Figure 4:
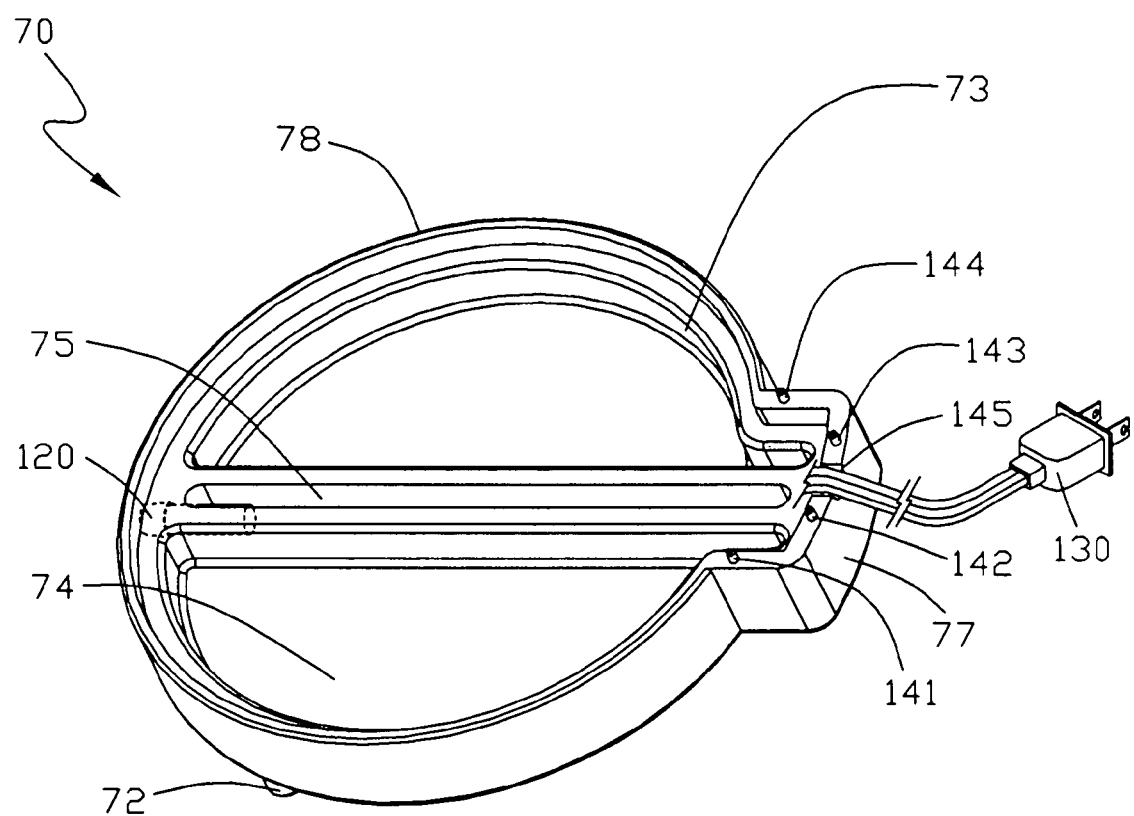
FIG. 4 is an enlarged perspective view of the base portion of the apparatus shown in FIG. 1 illustrated in isolation.
Figure 5:
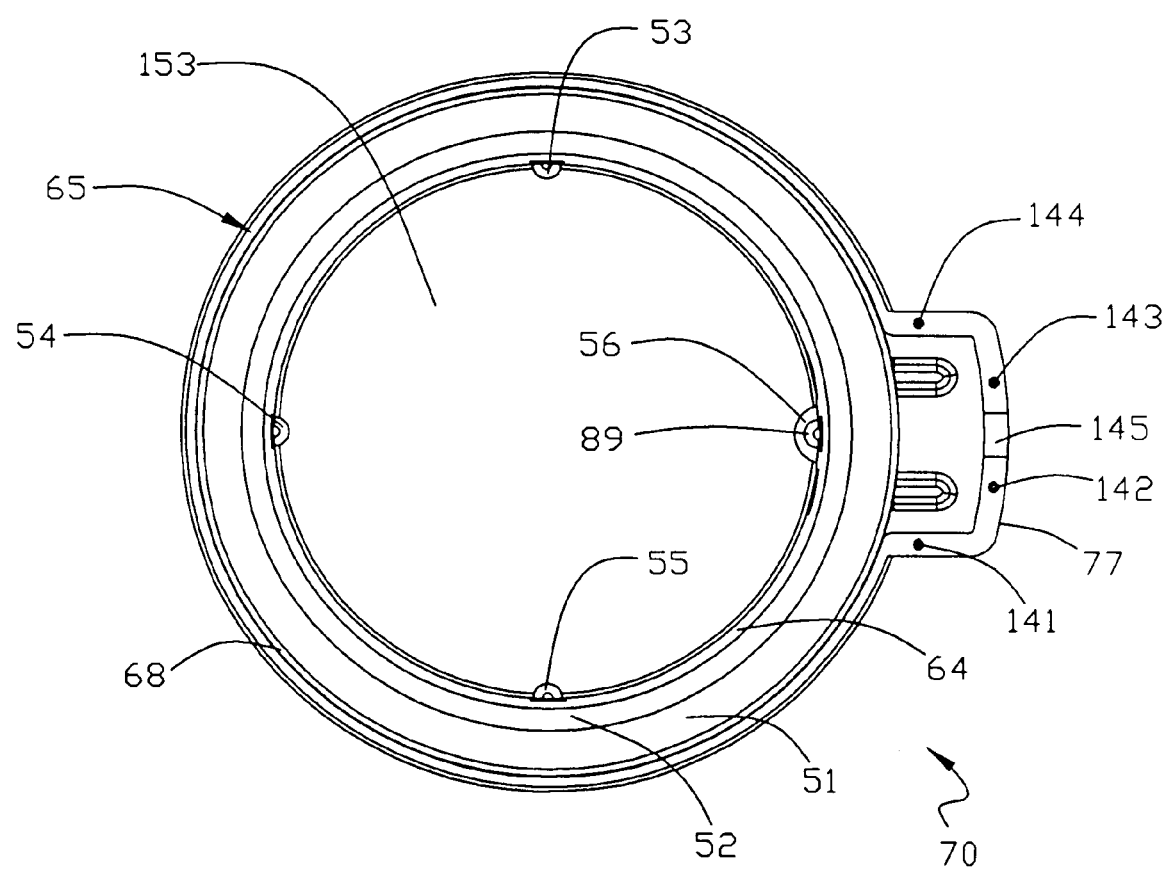
FIG. 5 is a top view of portions of the heating assembly without a container vessel installed in the heating assembly.

FIG. 4 shows that base 70 may include a ring 78 that extends in a substantially circular manner to complement the preferred circular and cylindrical shapes used for the housing and other parts of apparatus 10. Ring 78 has a circular groove that connects the bottom rim 69 of the outer casing or shell 65 to base 70 (FIG. 2).

The electrical power cord enters through aperture 145 and allows the connection to contacts 93 and 94 of the heating element 90 and the wire to light emitting diode (LED) light 120, via the trench 75.

In the preferred construction, the electrical system is very simple, as further described below.

Base electrical extension 77 may be provided with registration pins 141, 142, 143 and 144 which extend upwardly and into the bottom of cover piece 110. The electrical extension is also provided with an aperture 145 through which the electrical power cord enters.

Base 70 has openings 73 and 74 in the housing base. The open base may make the bottom of the heating vessel cooler and thus facilitate convection within the heating chamber.

FIG. 1 shows casing 65 oriented to show connection cover 110, heating assembly base 70 and its connection cover portion 77. The base openings 73 and 74 (FIG. 2) allow heat to be released to prevent excessive heat build-up within the casing.

Preferred base 70 has three feet 71, 72 and 76. Other feet configurations are possible. The tripod or trivet arrangement provides the well-known easy stabilization even when a supporting surface is not planar.

FIG. 1 shows casing 65 and connection cover 110 which covers the electrical terminals 93 and 94 of the heating element. It also encloses other electrical components as described below.

Housing

Experiments suggest having a separate housing to enclose the heating vessel improves heating consistency and improves heating times. Also, having a separate housing base with portions open to the ambient air improves heating consistency and times. Having the open section(s) in the housing base helps to keep the bottom of the heating vessel from getting too hot.

Casing 65 encircles heating vessel 50 when base 70 and heating vessel 50 are assembled together. When casing 65 is enclosed, air space 160 between vessel 50 and casing 65 is created. Air space 160 is open to ambient air by openings 73 and 74 in base 70 (FIG. 2). Casing 65 is connected to base 70 using a groove or recess formed in the upper surface of the base ring 78.

Heating Element(s) or Other Heat Source

Heating coil 90 is located near the bottom 153 (FIG. 3) of the heating vessel. More particularly and preferably, the heating coil or other heat source or sources do not appreciably touch the bottom wall; even more preferably, they do not directly touch the bottom wall 153 of heating vessel 50. Heating coil or coils 96 of heat source 90 may advantageously be supported by a suitable coil support, such as coil support 97 which is designed to provide minimal indirect contact.

Alternatively, the heating vessel heater may be supported in a suspended position. As shown, support is provided by openings 151 and 152 (FIG. 2) of heating vessel 50 which hold the heating coil 90 above the bottom 153 of the heating vessel along with the preferred coil support 97. Holes 101 and 102 of insulation plate 100 allow the heating element contacts to extend therethrough.

Heating source 90, in its preferred form, has two loops 95 and 96. In the size, shape and configuration shown, the heat source 90 is advantageously an electrical resistance heating coil or coils using approximately 115–120 watts of electricity. A very large percentage or all of this consumed electricity dissipates from the heating coil or coils. Other wattage devices or types of heat sources may be used to accomplish the inventions depending on the specific size, shape and configurations used to implement the invention. The currently known best mode configuration has a heating element with two loops about a central opening formed within and arranged about the central opening 85 of the baffle which acts as a modifying buffer or shield 80. The preferred heat source 90 provides between approximately 117–120 watts to give the best heating times. A 115 watt resistive heating element 90 of the same general design worked well but heated more slowly. Heat sources above 120 watts heated faster than desired for this particular one-quart capacity pitcher.

It was found a two-loop centrally open resistive 117–120 watt coil heating element made by TEMPCO worked best from the standpoint of heating time. A 115 watt electrical resistance heating coil made by TEMPCO worked well from the standpoint of even heating. The 117–120 watt heating elements gave the shortest heating times, while avoiding the need for stirring, and did so without causing splattering, sticking, scorching, or burning.

Heating coils of the same design in the 123–139 wattage and above range were too hot for the size, shape, capacity and other desired attributes associated with the one-quart capacity food container shown and described herein. The wattage required for the heat source in a specific embodiment will depend upon the size of the heating pitcher, its heating vessel, and the volume of air in the air spaces.

It is believed that there is some advantage to using a lower wattage heat source. Radiant energy released by a heat source is proportional to the fourth power of the absolute temperature of the heat source. This means at lower wattage, and the associated lower absolute temperatures, the heat source emits less radiant energy. Thus, the less radiant energy to be blocked or reflected, then the less likelihood that the upper surface of the buffer will become a significant source of re-radiated energy. The buffer preferably prevents or greatly reduces direct impingement of the radiant energy from beaming directly onto the food container.

At the connection end of heat source 90 are heat and electricity insulators, isolators or resistors 91 and 92. These insulation ferrules 91 and 92 are positioned to protect heating vessel 50, insulation piece 100, and connection cover 110 at the points where heat coil 90 contact ends 93 and 94 pass therethrough. Heat source 90 is in part supported and suspended from isolators 91 and 92. Insulation piece 100 reflects heat and has apertures 101 and 102 for connection ends 93 and 94. The connection between contacts 93 and 94 and a power cord 130 is covered by upper connection cover 110 and its preferred counterpart electrical extension 77 on the apparatus base 70.

Heating Element Control

Another desired advantage of the invention is foolproof simplicity. Plug the preferred device in, come back an hour or less later, and one has evenly heated sauces and side dishes, without stirring, with no sticking, scorching or burning, and typically without bubbling or spattering. This makes cleanup of the heating pitcher easy. Only soap and hot water are required to clean up, without scouring, scraping, or chipping at burned-on foodstuffs.

The preferred heating element control has a timer (not illustrated) that controls electrical current to the element 90 and turns off after one hour. The desired control circuitry provides electricity to the indicator light (LED) 120 (FIGS. 2–4) to show the apparatus is plugged in. The timer automatically shuts the heating coils off using a suitable relay switch (not shown) after the heating period is completed. In an alternative embodiment, a further indicator, such as a differently colored LED, may be used to indicate whether the heating coils are in operation or switched off. The indicator 120 is used to show the apparatus is plugged into a regular electric supply outlet.

There is an advantage of further shortening the heating time without the disadvantages of uneven heat flux and temperatures which can cause scorching, sticking and burning. A preferred embodiment of the inventions may heat sauces more energy efficiently. The heating source is not cycled but instead remains on during the heating time. Thus, a lower wattage heating source may be used. Since there is less collateral circuitry, there is less energy wasted on control devices and circuits. Even the "plugged in" indicator light 120 is a low energy device.

Operational Indicators

The heating assembly advantageously has one or more operational indicators to assist the user during operation. In the apparatus shown, a light emitting diode (LED) 120 is provided. LED 120 is for indicating when heating assembly 12 is plugged into or otherwise connected to a source of electrical power. The indicator is shown located at the end of trench 75 in the base 70 (FIGS. 2–4). In the preferred embodiment of the concept design of apparatus 10 and the heating assembly part thereof, the LED 120 is red and is lighted as long as the device is plugged in. In an alternative configuration(s), there can be more than one indicator or indicating light. For example, there could be a red LED to indicate the device is plugged in and a second, possibly yellow LED to indicate the heating element 90 is being actively powered and is heating the heating vessel and food container.

More complex indicator configurations are also possible but increase costs and may or may not provide sufficient added information to justify such added costs.

Baffle

It was discovered that an improved apparatus and method of heating by using a baffle modifier or divider acts to divide the heating chamber within the heating vessel, and reduces or eliminates direct radiant heating of a food container. It further affects the pattern of convective flow of heated air within the heating vessel by inducing such convective flows or enhancing them.

It was discovered that it is preferred to have a baffle which acts as a diverter with at least one hole therein. This may be provided using different shapes. In the case of the preferred embodiment, it is provided in the form of an isolated center hole 85 and isolated peripheral opening areas 57, 58, 59 and 60 relative to the inside of the heating vessel. Central hole 85 is in areal size preferably smaller than the outer area or areas around or near the periphery of the heating chamber. In some preferred embodiments, the central hole is about thirty to ninety percent of the outer area(s); more preferably, about thirty-five percent to about eighty percent of the outer area(s); even more preferably about forty percent to about seventy percent; still further preferably about forty-five to sixty-five percent.

One hypothesis is that with the inner area being smaller than the outer openings, causes the central hole in the baffle to act as an air sink. Correspondingly, the edge or outer openings allow heated air to rise through them and along the periphery of the heating vessel. The air is then cooled as it heats vessel 50 and then descends down along the outer surfaces of the food container or vessel. This down-wash occurs after heat is already lost to the heating vessel so the temperature has been reduced. This reduced temperature helps prevent scorching and sticking. If properly designed, this configuration reduced or totally eliminated such deleterious effects. This also suggests that the heating chamber divider creates convection air flows that emphasize heating of the food container along the side walls while reducing the heating that occurs at the bottom wall of the food container. The air flow along the bottom has lost heat to both the heating vessel and the food container.

The currently preferred inventive apparatuses also suggest that they work best if the heating chamber baffle also acts as a diverter which is larger than or otherwise covers the heat coils 90 or other heating source. The baffle acts as a shield to the bottom of the food container from most or all direct radiant heating by blocking and/or reflecting the radiant heat rays from beaming upon the pitcher and toward the second or heating vessel. The baffle shields the bottom wall of the food container from direct radiant heat flux to thus prevent the bottom from developing high temperatures and prevents it from being a hot spot. In this configuration the heat source is sized and positioned relative to the openings in the baffle so that direct radiant heat flux is relatively low or eliminated. The baffle is preferably positioned between the heat source and food container. The current preferred buffer acts as a heat flux modifier and air diverter which induces convective air flows. The currently preferred version works best if the buffer or diverter is located parallel with and approximately halfway between the heat source and the food container bottom wall.

FIG. 2 shows baffle 80 located below pitcher 20. When pitcher 20 is suspended in heating vessel 50, baffle 80 is located below pitcher 20. Baffle 80 appeared to work best when positioned parallel with and about halfway between bottom 25 of container 20 and the heat source 90.

Baffle or divider 80 is a piece of heat-resistant material and may have good radiant heat energy reflective and/or absorption properties. There is a broad range of materials that can be used. The preferred material is a metal that will not be deformed or vaporized by heat source 90. One suitable example is aluminum 0.063 inch thick. It is also desirable to have a surface that will reflect more radiant energy than it will absorb. To date it was found that aluminum is the best metal to use for baffle 80. It may also be possible to have baffle 80 made from other suitable heat-resistant materials. For example, it may be made from ceramics, other metals, or other materials now known or hereafter found suitable. In its preferred form, baffle 80 is stamped from sheet aluminum of various types.

Baffle 80 has a central opening 85 and support tabs 81–84. Support tab 84 is wider than tabs 81–83 and has a key indentation 86. Keying portion 86 is shown as having an open U-shape. Key 86 and rib 89 can be various shapes. As shown, keying rib 89 is the male shape and key 86 is the female part of the key. The purpose of the key is to position baffle 80 so it will be positioned with support tabs 81, 82, 83, and 84 over their corresponding support ridges 53, 54, 55, and 56 (see a FIG. 3). Keyed tab 84, with key 86, is located with support 56 which has key rib 89 extending upward from the surface of support 56. An additional purpose of the keyed parts 86 and 89 is to keep the baffle 80 from rotating.

Figure 6:
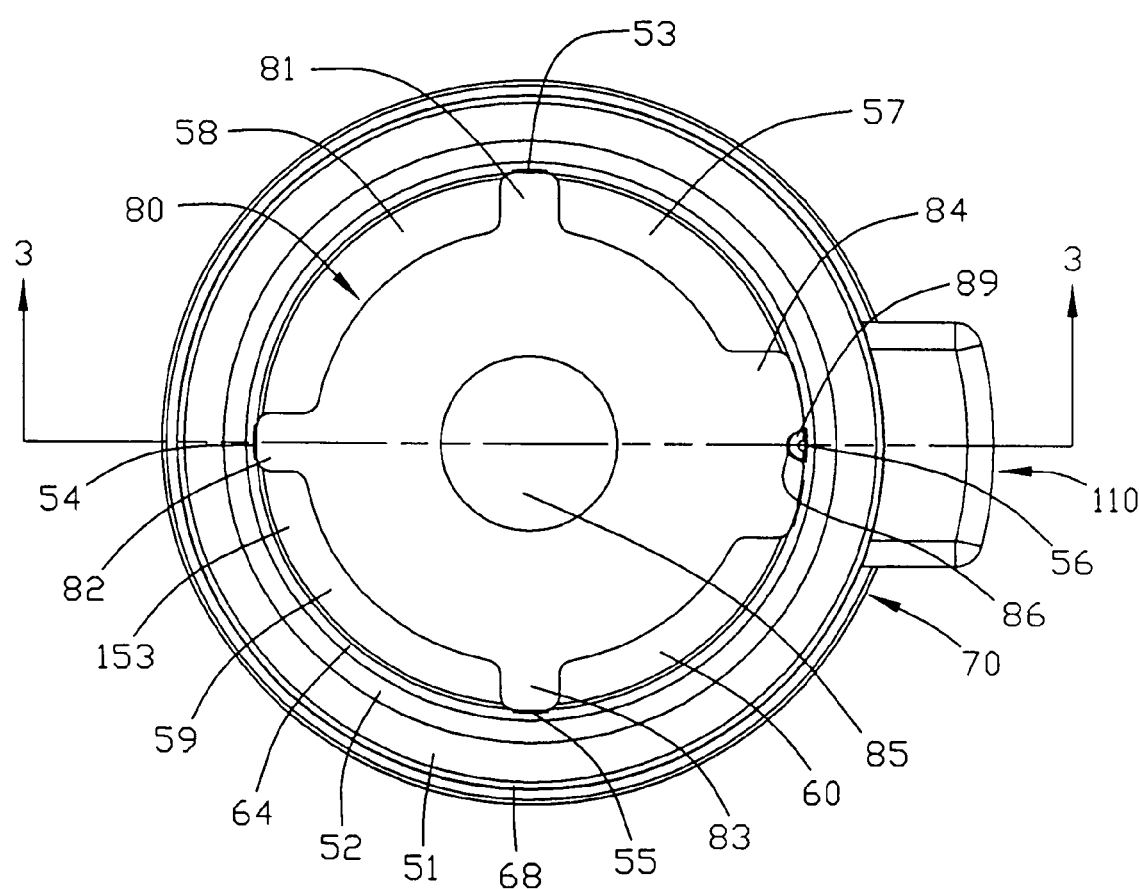
FIG. 6 is a top view of portions of the heating assembly with a heat flux baffle positioned therein.

If the baffle 80 in the preferred configuration shown herein were to rotate within heating vessel 50, then it might fall from its support ridges 53–56 onto heat coil 90. It is preferred that baffle 80 have a bottom surface 88 capable of and efficient at reflecting infrared energy. Baffle 80 has two principle functions. It prevents or reduces radiant heating of pitcher 20, and it induces air flow that principally rises through four outer openings 57–60 (FIG. 6). As shown, these openings 57–60 are peripherally located at the outer edges of baffle 80, between tabs 81–84. Central opening 85 of baffle 80 is believed to act as a sink for cooled return air, although the exact manner of operation is not known with certainty.

In some preferred forms of the invention, the heating chamber baffle 80 is located above heat source 90 and is sufficiently large to more than cover coils 95 and 96 of heat source 90. Heat source 90 has a central opening smaller than central opening or openings 85 of baffle 80 (FIG. 2). It is alternatively possible to provide the configuration of the inner opening or openings in other shapes and sizes. For example, a cross-shaped inner opening centrally positioned has been tested and found operable but not as preferred. Further, another configuration having multiple smaller inner opening holes has been tested and found less preferred, but operable. Many other configurations for the inner opening or openings may alternatively be operable. The inner and outer openings can also be formed as a single opening shaped similar to a four-leaf clover with the outer holes connected by small slits to the inner hole.

Radiant Heat Shielding

Some of the prior art teaches constructions and techniques that reflect radiant heat energy toward the container being heated. This is usually done by positioning the reflector underneath the heating element. This approach demonstrates a deleterious effect of focusing heat onto the container and causes hot spots. After more than three years of experimenting, it was discovered the prior art had it backwards. By reflecting radiant energy away from the heating pot, and inducing and controlling air flow, far more even heating is possible. Also counter-intuitively, the reduced radiant heating not only enhanced the evenness of the heating, but it also reduces the time to heat sauces and side dishes by between approximately 50 and 100 percent. This is believed to occur at least partly because of the induction of convective air flows within the heating vessel and about the heated container.

Convective Heating Induction

It is believed central opening 85 acts as a sink for falling air which has been cooled by warming the heating vessel 50 and the pitcher 20. This creates an air convection flow from heating coil 90 up and through openings 57–60, then into air space 201 surrounding side 26 of the lower portion of pitcher 20, where the heated air transfers its heat energy to pitcher 20. This in turn transfers heat energy to the foodstuff being heated in pitcher 20. Once air in space 201 is cooled, it sinks back toward diverter 80. The large volume of heated air rising through openings 57–60 is believed to force the cooled air to sink toward central opening 85 in baffle 80. The air continues its downward journey through the central opening in heating coils 90 to bottom 153 of vessel 50 where it is again heated by coils 90 and again rises through the outer openings 57–60. It is believed that by reflecting radiant energy from heating element 90 back down toward bottom 153 of vessel 50, the air at bottom 153 is heated more efficiently, which promotes a more effective circulation system and provides a convection cycle with air currents flowing within vessel 50. This is believed to contribute to the shorter heating time and more even heating produced by the current inventions for preferred device 10.

FIG. 3 is a cross-sectional illustration of apparatus 10 with pitcher 20 installed in the container receiver and in position within vessel 50. Vessel 50 is sealed or in tight-fitting relationship when pitcher 20 is in place within the heating assembly receiver. Beveled edge 52 of vessel 50 and shoulder 24 of pitcher 20 cause pitcher 20 to center itself in the interior space 50a of vessel 50. When pitcher 20 is centered in vessel 50, there is an approximately uniform space between the outside of side wall 27 and the inside of the heating vessel side wall 64. Apparatus 10 works best if an annular or approximately annular space is formed; more preferably, by having an approximately uniform space 201 provided between side 26 and wall 64.

In other embodiments, such as an embodiment which has a larger pitcher 20 and vessel 50, a larger space 28 may be preferred or needed. Preferred pitcher 20 is a one-quart container and works best when air space 28 between wall 64 and side 26 does not exceed approximately one-half inch and is not closer than approximately one-quarter inch with the indicated heating element 90. A space 28 of less than approximately one-quarter inch was found to slow heating and increase heating time periods. There may simply be too little space or the space is too restricted for proper air movement, such as circulation, within space 201.

Additional Aspects of Methods, Manner of Using and Operation

The methods taught herein may include reflecting radiant energy downward or away from the heat source by placing a baffle which acts as a modifying shield and/or diverter therebetween, such as above the heat source. This may more quickly heat the air at or below the heating element. Reflecting radiant energy away from the heating pot bottom has the added advantage of reducing uneven heating between the side and the bottom of the pitcher, because there is less chance of developing hot spots. Localized hot spots can cause localized overheating, boiling, spattering, scorching and even burning of the contents of the heating pitcher.

FIGS. 1, 3 and 6 show various aspects of baffle 80. FIG. 1 shows baffle 80 to be generally circular with support tabs 81, 82, 83 and 84 extending from the outer circumference. Support tab 84 is wider than tabs 81, 82 and 83 which are of a uniform size and shape. Tab 84 is wider because it shields the heating element lead sections which extend through openings 151 and 152 of vessel 50.

Manner of Making

The apparatus or apparatuses according to the invention are made using a variety of conventional manufacturing processes so as to provide the assembly illustrated, or other forms of the invention. For example, the heating vessel and food container may be made using a variety of metal working techniques such as drawing, fabricating or casting. The handle or handles, if provided on the food container, may be made in a variety of conventional techniques now known or hereafter developed in the art of producing pitchers, pans and other suitable manners for container manufacturing.

The outer casing may be formed of non-metallic materials, such as a variety of plastics or other materials, which may be molded, fabricated or otherwise formed into the illustrated shape or another configuration. This may be desired if the apparatus is to be provided in a particular shape or design appearance.

The currently preferred electrical resistance heating element may be made from various conventional techniques according to the current state of the art in manufacturing for such a component or components.

The lid is also made according to a variety of conventional manufacturing techniques now known or hereafter developed and depends on whether the preferred stainless steel or some other suitable material is used.

The base may be made using various materials and manufacturing techniques, such as by molding plastic and then provided with the preferred feet or suitable alternative structures which function so as to provide space between the base and a supporting surface. As shown, the feet are integrally molded or fastened to the other portions of the base.

Exemplary Sizes of Apparatus Design

Figure 7:
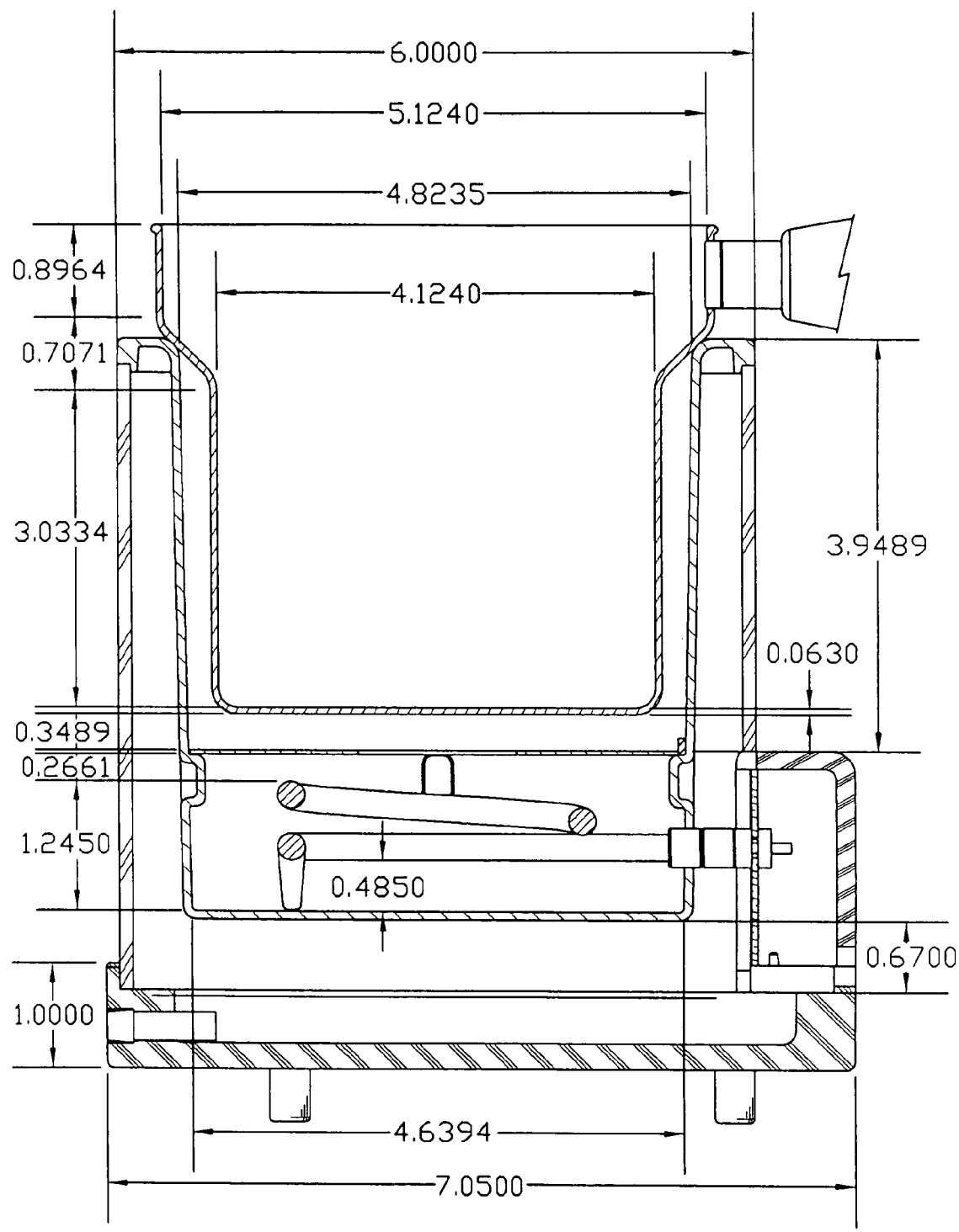
FIG. 7 is a sectional diagram showing preferred sizing for a one-quart capacity container vessel.
Figure 8:
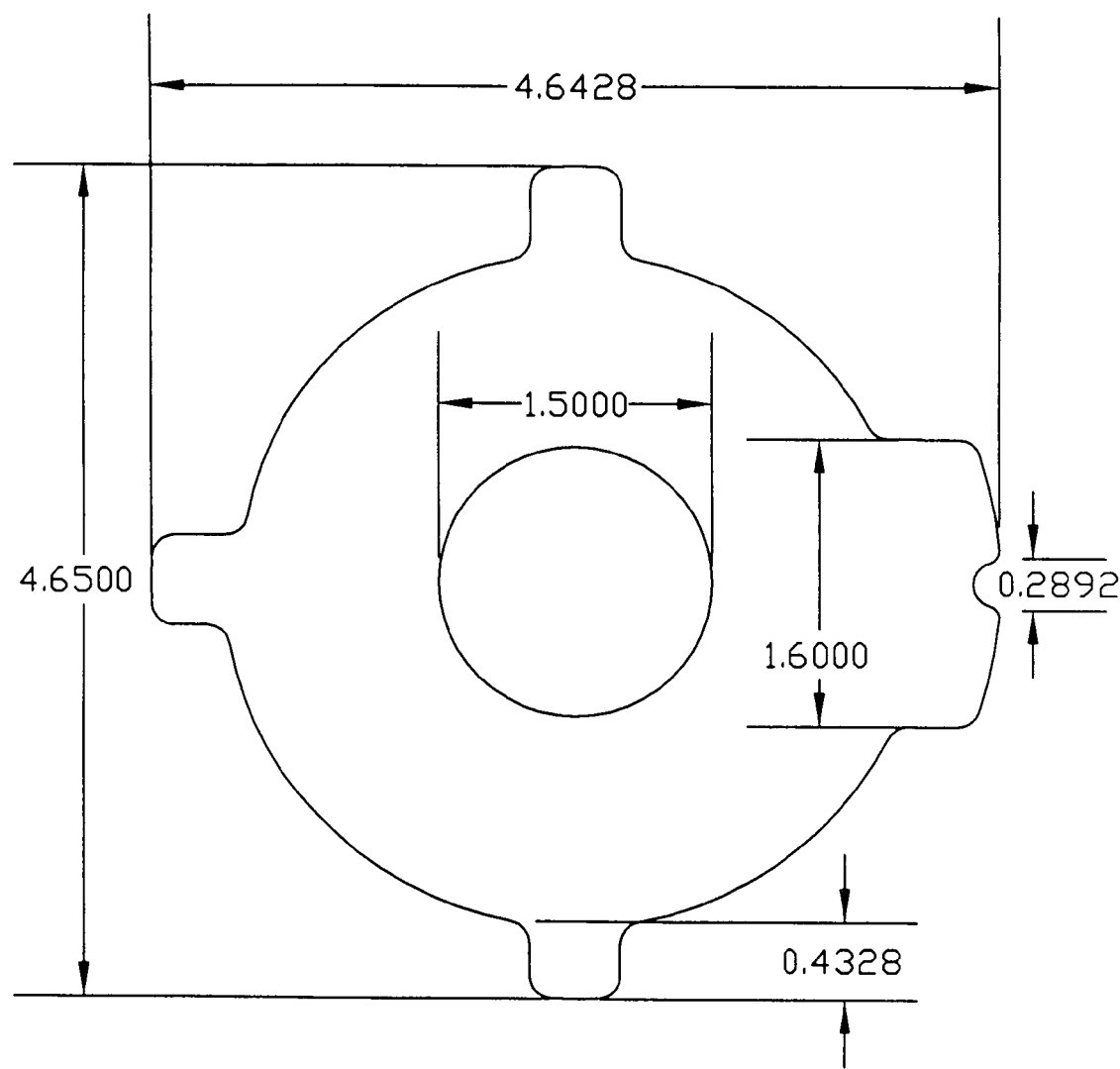
FIG. 8 shows sizing of a preferred baffle used in the apparatus of FIGS. 1–7.

This detailed description has described the preferred embodiment of the invention in conceptual terms and in some places by providing size information. FIGS. 7 and 8 show noteworthy exemplary dimensions for an apparatus built to provide one-quart capacity within the food container. Numerous other embodiments are possible. Although the preferred embodiment has specific spacings, other spacings are possible and may be needed if the capacity is changed.

The tests of heating prepared foods and sauces were made in four identical polished, one-quart prototypes, as shown in the drawings and previous descriptive writings. Heating tests have been made on prepared stews, soups, chilies, syrups, gravies, butter, milk and some frozen foods.

Temperatures of the foodstuffs went from room temperature at 70 degrees to below freezing of 32 degrees Fahrenheit, all heated to a temperature of 170 to 190 degrees in one hour or less without stirring, burning, scorching or sticking to the pot. Some tests of foodstuffs heated past the one-hour shut-off (by resetting) did not burn, scorch or stick to the pot; some liquid was lost due to dehydration.

EXAMPLES

Example 1

A 10-½-ounce can of Beef Gravy was placed into the food pitcher and heated from room temperature. The food container was placed into the heating apparatus 12. No lid was used. The following temperatures were observed:

| Time in minutes | Temperature in degrees Fahrenheit | Comments |
| --- | --- | --- |
| 0 | 70 | |
| 15 | 80 | |
| 30 | 120 | Bubbling |
| 45 | 185 | Bubbling |
| 60 | 180 | The apparatus stopped heating. It was unplugged and then the heated contents were stirred. The temperature stayed at 180. |

Example 2

A package containing 11 ounces of Stouffers Creamed Chipped Beef was removed from the package and heated from a frozen temperature of 10 degrees F. The food package was opened by scoring it deeply with a sharp utensil, then broken in half, and the contents were placed into the food container. The food container was then placed into the heating apparatus 12. No lid was used. The following temperatures were observed:

| Time in minutes | Temperature in degrees Fahrenheit | Comments |
| --- | --- | --- |
| 0 | 10 | Still frozen |
| 15 | 10 | Still frozen |
| 30 | 40 | Thawing, pushed down |
| 45 | 130 | Bubbling, settled itself |
| 60 | 190 | The apparatus stopped heating. It was unplugged and then the heated contents were stirred. The temperature stayed at 180. |

Example 3

A 15-ounce can of Chili with Beans was opened and placed into the food container and then heated from room temperature. The food container was placed into the heating apparatus 12. No lid was used. The following temperatures were observed:

| Time in minutes | Temperature in degrees Fahrenheit | Comments |
| --- | --- | --- |
| 0 | 70 | |
| 15 | 75 | |
| 30 | 105 | Bubbling |
| 45 | 140 | Sealed flat |
| 60 | 195 | The apparatus stopped heating. It was unplugged and then the heated contents were stirred. The temperature stayed at 190. |

Example 4

A 9-ounce package of frozen (10 degrees F.) Green Giant Green Bean Casserole packaged in a boil-in bag package was scored deeply with a sharp utensil, broken in half, and the contents placed into the food container. The food container was placed into heating apparatus 12. No lid was used. The following temperatures were observed:

| Time in minutes | Temperature in degrees Fahrenheit | Comments |
| --- | --- | --- |
| 0 | 10 | Vegetables in a pile |
| 15 | 10 | Still frozen |
| 30 | 40 | Thawing |
| 45 | 135 | Bubbling, settled itself |
| 60 | 180 | The apparatus stopped heating. It was unplugged and then the heated contents were stirred. The temperature stayed at 180. |

Example 5

A 10-½-ounce can of Vegetable Soup with 1 can of water was placed in the food container and placed into heating apparatus 12. No lid was used. The following temperatures were observed:

| Time in minutes | Temperature in degrees Fahrenheit | Comments |
| --- | --- | --- |
| 0 | 70 | Room temperature |
| 15 | 70 | |
| 30 | 110 | |
| 45 | 165 | |
| 60 | 185 | The apparatus stopped heating. It was unplugged and then the heated contents were stirred. The temperature stayed at 185. |

Example 6

A 10-ounce package of Stouffer's Cheddar Potato Bake was taken from its plastic tray and heated from a frozen temperature of 10 degrees F. The food was placed into the food container. The food container was placed into the heating apparatus 12. No lid was used. The following temperatures were observed:

| Time in minutes | Temperature in degrees Fahrenheit | Comments |
| --- | --- | --- |
| 0 | 10 | Frozen |
| 15 | 10 | Still frozen |
| 30 | 40 | Thawing, pushed down |
| 45 | 90 | Bubbling, pushed down |
| 60 | 190 | The apparatus stopped heating. It was unplugged and then the heated contents were stirred. The temperature stayed at 185. |

Example 7

Two cups of Pancake Syrup were placed into the food container. The food container with contents were placed into the heating apparatus 12. No lid was used and no stirring was performed. The following temperatures were observed:

| Time in minutes | Temperature in degrees Fahrenheit | Comments |
| --- | --- | --- |
| 0 | 70 | |
| 15 | 105 | |
| 30 | 155 | |
| 45 | 195 | Simmering |
| 60 | 205 | The apparatus stopped heating. It was unplugged and then the heated contents were stirred. The temperature stayed at 200. |

Example 9

One-half quart of milk from the refrigerator was placed into the food container. The food container was placed into the heating apparatus 12. No lid was used. The following temperatures were observed:

| Time in minutes | Temperature in degrees Fahrenheit | Comments |
|---|---|---|
| 0 | 40 | |
| 15 | 85 | |
| 30 | 135 | |
| 45 | 170 | Skin on top |
| 60 | 195 | The apparatus stopped heating. It was unplugged and then the heated contents were stirred. The temperature stayed at 190. |

Example 8

A package of Stouffer's Creamed Chipped Beef was thawed in a refrigerator overnight and heated from a temperature of 40 degrees F. The food and ⅓ cup milk were placed into the food container. The food container was placed into the heating apparatus 12. No lid was used. The following temperatures were observed:

| Time in minutes | Temperature in degrees Fahrenheit | Comments |
|---|---|---|
| 0 | 40 | No stirring |
| 15 | 50 | No stirring |
| 30 | 85 | No stirring |
| 45 | 155 | Bubbling |
| 60 | 190 | The apparatus stopped heating. It was unplugged and then the heated contents were stirred. The temperature stayed at 185. |

Example 10

Prosaic Example—A 1-quart jar of spaghetti sauce at room temperature was placed into the food container. The food container was placed into the heating apparatus 12. A lid was used. Only 45 minutes of heating time. The following temperatures were observed:

| Time in minutes | Temperature in degrees Fahrenheit | Comments |
|---|---|---|
| 0 | 70 | No stirring |
| 15 | 75 | No stirring |
| 30 | 155 | No stirring |
| 45 | 190 | The apparatus stopped heating. It was unplugged and then the heated contents were stirred. The temperature stayed at 175. |

FURTHER ASPECTS AND FEATURES

The above description has set out various features and aspects of the inventions and the preferred embodiments thereof. Such aspects and features may further be defined according to the following claims which may individually or in various combinations help to define the invention.

INTERPRETATION NOTE

The inventions shown and described herein have been described in language directed to the current preferred embodiments also shown and described with regard to various structural and methodological features. The scope of protection as defined by the claims is not intended to be necessarily limited to the specific sizes, shapes, features or other aspects of the preferred embodiments shown and described. Other forms and equivalents for implementing the inventions can be made without departing from the scope of concepts properly protected hereby.

I claim:

1. An apparatus for heating and holding foodstuffs or other contents needing heating without high heat flux to the contents, comprising:
a first vessel for containing the foodstuffs or other contents being heated;
a second vessel adapted for allowing at least portions of the first vessel to be installed into and removed from a first vessel receiver having at least portions thereof within the first vessel; said first and second vessels being further adapted to provide a close-fitting relationship when the first vessel is installed into the second vessel for helping to retain heat therebetween;
a baffle mounted between the first and second vessels and at least partly below the first vessel; said baffle having at least one opening therethrough for reducing radiant heating of the first vessel and for affecting air flow in a heating space formed between the first and second vessels when the first vessel is installed into the second vessel;
a heat source for heating said first and second vessels;
wherein the baffle and the heat source are arranged with the baffle between the heat source and first vessel and so as to have a contiguous communicating air space through which convective air flow may pass through the baffle in said heating space between the first and second vessels.

2. An apparatus according to claim 1 wherein the first vessel has an open top end for receiving foodstuffs or other contents being heated and a closed bottom end.

3. An apparatus according to claim 1 wherein the first and second vessels are approximately cylindrical.

4. An apparatus according to claim 1 further comprising and wherein the first and second vessels form an annular heating space therebetween when the first vessel is installed at least partially into a container receiver having at least portions extending into the second vessel.

5. An apparatus according to claim 1 further comprising at least one detachable cover for closing at least part of a top opening of said the first vessel.

6. An apparatus according to claim 1 wherein the first vessel is made of a heat conducting metallic material.

7. An apparatus according to claim 1 wherein the first vessel is received by said second vessel in the first vessel receiver in an approximately coaxial relationship.

8. An apparatus according to claim 1 wherein said at least one heat source is mounted within the second vessel between the baffle and a bottom of the second vessel.

9. An apparatus according to claim 1 further comprising at least one indicator for indicating operational aspects of the apparatus.

10. An apparatus according to claim 1 wherein the baffle is removable from the second vessel.

11. An apparatus according to claim 1 wherein the baffle has inner and outer openings formed therethrough.

12. An apparatus according to claim 1 wherein the baffle has inner and outer openings formed therethrough with an area of the outer openings that is greater than an area of the inner openings.

13. An apparatus for heating a container for foodstuffs or other contents without subjecting the container to high heat flux, comprising:
   a heating vessel having a heating vessel chamber therewithin;
   a container receiver having at least portions within the heating vessel chamber providing a container receiving space within the heating vessel chamber into which a container may be at least partly installed; said container receiver being configured to provide a substantially sealed heating space about a container when a container is installed therein;
   at least one heat source for heating said heating vessel and heating vessel chamber;
   a baffle mounted within the heating vessel chamber below said container receiver so as to not prevent a container from being installed into said container receiving space; said baffle having at least one opening therethrough; said at least one opening being configured to reduce radiant heat from said at least one heat source to said container receiver; said baffle also being configured and adapted for allowing and affecting communication of air heated by said at least one heat source through said at least one opening and affecting flow of air within said heating vessel to heat said container receiving space;
   wherein the baffle is positioned between said at least one heat source and said container receiver so as to have a contiguous communicating air space through which convective air flow may pass through the baffle into said heating space.

14. An apparatus according to claim 13 wherein said at least one heat source is mounted within the heating vessel between the baffle and a bottom of the heating vessel.

15. An apparatus according to claim 13 further comprising at least one indicator for indicating operational aspects of the apparatus.

16. An apparatus according to claim 13 wherein the baffle has inner and outer openings formed therethrough.

17. An apparatus according to claim 13 wherein the baffle is removable from the heating vessel.

18. An apparatus according to claim 13 wherein the baffle has inner and outer openings formed therethrough with an area of the outer openings that is greater than an area of the inner openings.

19. A method for heating foodstuffs, comprising:
   providing a heating vessel having a container receiver at least partially therein and a baffle below said container receiver, said baffle having at least one opening therethrough, at least one heat source, said baffle being positioned between the at least one heat source and the container receiver;
   installing a food container into the heating vessel with at least part of the food container being within the container receiver;
   fitting the food container into close-fitting relationship with the heating vessel substantially sealing a heating space between the heating vessel and food container;
   shielding the food container from substantial amounts of radiant energy using said baffle;
   inducing convective air flows within the substantially sealed space between the heating vessel and food container by including at least one opening in said baffle that has inner opening portions and outer opening portions;
   heating air below the baffle using said at least one heat source;
   providing convective air flows by heating using said at least one heat source, said convective air flows being affected by the baffle and said at least one opening therethrough.

20. A method according to claim 19 further comprising shielding radiant energy provided by said at least one heat source positioned within the heating space to reduce radiant energy which impinges or beams directly upon the container receiver.

* * * * *

UNITED STATES PATENT AND TRADEMARK OFFICE
CERTIFICATE OF CORRECTION

| | |
|---|---|
| PATENT NO. | : 7,167,642 B1 |
| APPLICATION NO. | : 11/345841 |
| DATED | : January 23, 2007 |
| INVENTOR(S) | : Alfred R. Wagner |

It is certified that error appears in the above-identified patent and that said Letters Patent is hereby corrected as shown below:

On title page
1. At page 2, under the topic heading Item [56] "Foreign Patent Documents", the patent number "DE 627227" is incorrectly shown. It should be --DE 628227--.

2. At Column 6, Line 24, replace the word "holly" with --wholly--.

3. At Column 15, Line 32, replace the word "Sealed" with --Settled--

4. At Column 16 line 63 and 17, Col. 17, line 16 under the headings "Example 9" and "Example 8", respectively, reverse the numerical order to show Example 8 first, followed by Example 9.

Signed and Sealed this

Eighth Day of May, 2007

JON W. DUDAS
*Director of the United States Patent and Trademark Office*